United States Patent [19]

Liu

[11] Patent Number: 4,708,169

[45] Date of Patent: Nov. 24, 1987

[54] PNEUMATIC PRESSURE GAUGE

[76] Inventor: Jackson Liu, No. 167-40, Chien Kuo Road, Sec. 2, Min Hsiung Hsiang, Chia I, Hsien, Taiwan

[21] Appl. No.: 930,579

[22] Filed: Nov. 13, 1986

[51] Int. Cl.⁴ .............................................. F16K 37/00
[52] U.S. Cl. .................................... 137/557; 137/227; 137/230; 116/34 R; 116/137 R; 116/DIG. 7
[58] Field of Search ........ 116/34 R, DIG. 7, DIG. 8, 116/137 R; 137/227, 230, 557

[56] References Cited

U.S. PATENT DOCUMENTS

| | | | |
|---|---|---|---|
| 1,196,142 | 8/1916 | Schroeder | 137/227 |
| 1,482,517 | 2/1924 | Kelsey | 137/227 |
| 2,334,095 | 11/1943 | Hoghaug | 116/34 R |

Primary Examiner—A. Michael Chambers
Attorney, Agent, or Firm—Michael N. Meller

[57] ABSTRACT

An improved pneumatic pressure gauge used in inflating a pneumatic tire comprises an adapter means having a gas passage extending from a gas inlet end to a gas outlet end, and a gauge casing connected integrally to the adapter member. The gauge casing includes a gauge chamber, an opening intercommunicating the gas passage and the gauge chamber, a control chamber communicated with the gauge chamber, and a gas release passage opened to atmosphere and communicated with the control chamber. A first valve means is disposed to close the communication between the gas passage and the gauge chamber, and a second pressure responsive valve means is disposed in the control chamber to close the communication between the control chamber and the gas release passage. The valve means are opened when the pressure in the tire or the gas passage exceeds the predetermined pressure.

3 Claims, 2 Drawing Figures

PNEUMATIC PRESSURE GAUGE

BACKGROUND OF THE INVENTION

This invention relates to a pneumatic pressure gauge used for a pneumatic tire, particularly to a pneumatic pressure gauge having a pressure responsive means that can release gas from the tire when the pressure to which the tire is inflated exceeds a predetermined pressure.

It is a common practice to use a pressure gauge as guidance in inflating a pneumatic tire. The pressure gauge is applied to the tire when the pressure to which the tire is inflated is assumed to be substantially a required pressure. If the pressure is not right, it should be adjusted by letting out or adding some gas. Since pressure gauges available hitherto can merely measure the pressure present in the tire, it is necessary to detach and attach the pressure gauge again and again to let out or add the gas so as to achieve a desired pressure in the tire. The manipulation of such a pressure gauge is rather inconvenient.

SUMMARY OF THE INVENTION

An object of the present invention is to provide a novel pressure gauge that can not only determine whether the pressure to which a tire is inflated reaches a predetermined value or not, but also let the gas out if the pressure is excessive.

Another object of the present invention is to provide a pneumatic pressure gauge of simple construction that can produce a signal when the pressure in the tire reaches a desired state.

The present invention provides an improved pneumatic pressure gauge for use in inflating a pneumatic tire and the like which comprises an adapter means having a gas inlet end, a gas outlet end, and a gas passage extending from the gas inlet end to the gas outlet end, and a gauge casing connected integrally to the adapter member. The gauge casing includes a gauge chamber, an opening connecting the gas passage and the gauge chamber, a control chamber in communication with the gauge chamber, and a gas release passage opened to atmosphere and in communication with the control chamber. A first pressure responsive valve means is disposed to close the opening and to open the communication between the gas passage and the gauge chamber when the pressue in the gas passage exceeds a predetermined pressure. There is a second pressure responsive valve means disposed in the control chamber to close the communication between the control chamber and the gas release passage. The second valve means is opened when the pressure in the control chamber exceeds the predetermined pressure.

In one aspect of the invention, the first valve means includes a valve plug biased to normally close the opening, and a spring means having one end connected to the valve plug and the other end mounted fixedly in the gauge casing.

In another aspect of the invention, the gauge casing is telescopic and includes a first portion connected to the adapter means and a second portion connected threadedly to the first portion. The second portion can be turned relative to the first portion to adjust the force of the spring so that the valve plug is responsive to different desirable predetermined pressures. Preferably, the outer periphery of the first portion may be graduated.

In still another aspect of the present invention, the second portion has a cap closing, one end thereof opposite to the first portion, and a support body disposed in the second portion. The support body divides the interior of the gauge casing into two regions, one of the regions near the gas passage defining the gauge chamber, and the control chamber residing in the other region. The support body has a diametral bore which defines the gas release passage opening at the periphery of the second portion, a first axial bore intercommunicating the gauge chamber and the control chamber, and a second axial bore communicating with the diametral bore and opened to the control chamber.

In still another aspect of the invention, the second pressure responsive valve is a diaphragm member made of a rubber-like flexible material and is disposed in the control chamber to resiliently close the open end of the second axial bore. The diaphragm valve member opens the communication between the control chamber and the second axial bore when the pressure in the control chamber exceeds the predetermined pressure so as to permit the excess gas to escape through the gas release passage.

An exemplary preferred embodiment will be described in detail with reference to the accompanying drawings, in which:

DETAILED DESCRIPTION OF THE DRAWINGS

Figure 2:
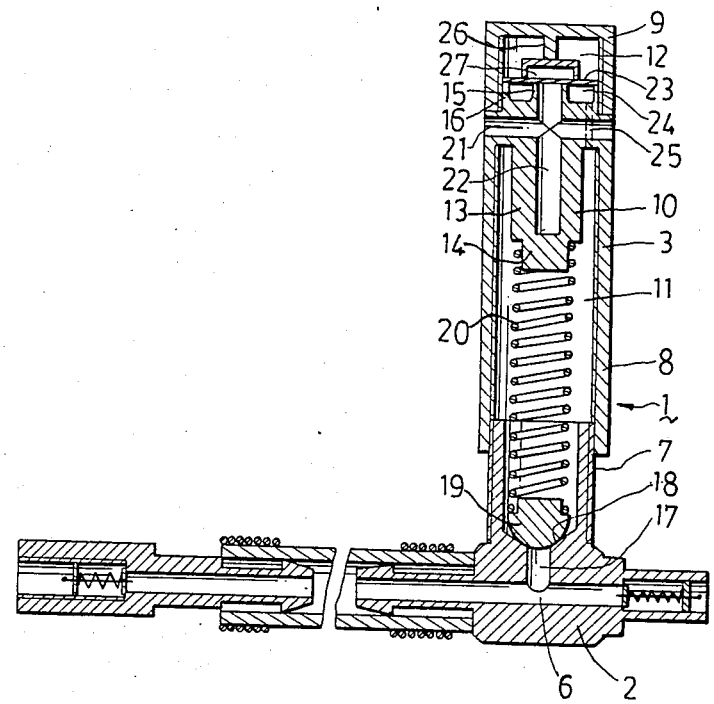
Figure 1:
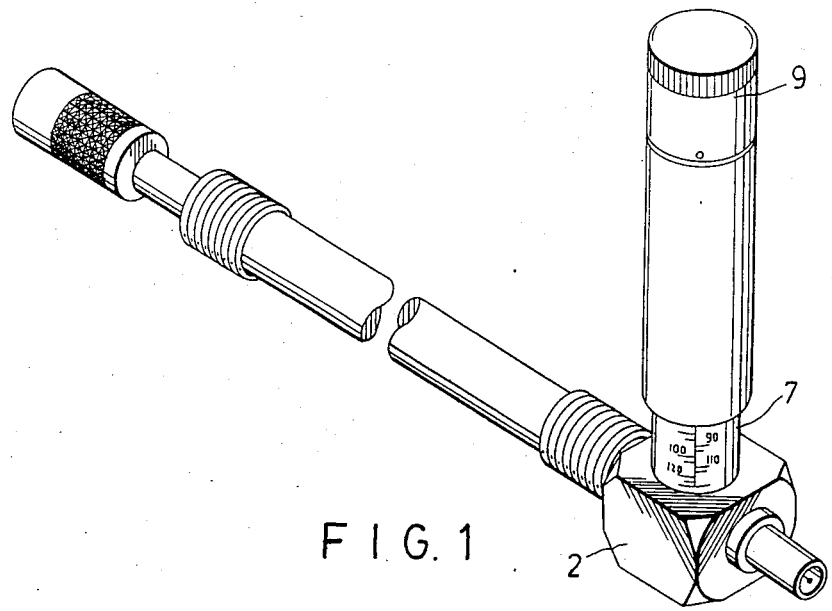

FIG. 1 is a sectional view of, a pneumatic pressure gauge constructed according to the pressent invention; and FIG. 2 is a perspective view of the pressure gauge of FIG. 1.

DETAILED DESCRIPTION OF THE PREFERRED EMBODIMENT

Referring to the drawings, a pneumatic pressure gauge 1 is shown, including an adapter piece 2 which incorporates parts to be connected to a hose of a pneumatic pump and an inflating valve of a tire to be inflated, and has a gas passage 6 extending from one end to the other. To the adapter piece 2 is connected integrally a pressure gauge casing 3. The gauge casing 3 is telescopic and is constituted of a first cylindrical portion 7 which is connected to the adapter piece 2 and a second portion 8 sleeved threadedly on the first portion 7. The outer periphery of the first cylindrical portion 7 is graduated.

At the top of the second portion 8 of the gauge casing 3 is attached threadedly a cap 9 to close the second portion 8. In the interior of the gauge casing 3 is disposed a support body 10 which divides the casing 3 into two regions 11 and 12. The support body 10 has a first tubular portion 13 with a closed end 14 extending axially into the region 11, a second tubular portion 15 with an open end extending axially into the region 12, and a third tubular portion 16 with an open end extending axially around said second, tubular portion 15.

The region 11 defines a gauge chamber which communicates with the gas passage 6 of the adapter piece through an opening 17 in the first portion 7 of the casing 3. Near the opening 17 is a valve seat 18 against which is seated a valve plug 19 to interrupt the communication between the gas passage 6 and the gauge chamber 11. The valve plug 19 is biased by a compression spring 20, which in turn is affixed to the closed end 14 of the support body 10. The valve plug 19 is biased by a spring force predetermined to be equivalent to the desired pneumatic pressure to which a tire is to be inflated. According to graduated marks of the first portion 7 of the casing 3, the spring force can be adjusted by turning the second portion 8 relative to the first portion 7 of the gauge casing 3 so as to make the gauge 1 suitable for use in determining and controlling different pneumatic pressures of tires. The valve plug 19 is responsive to the predetermined pressure of the gas passage 6 and can be moved against the spring force to open the opening 17 when the predetermined pressure is reached.

The support body 10 is provided with a diametral bore 21 opening ar the periphery of the second portion 8 of the casing 3, and an axial bore 22 intersecting the diametral bore 21 and extending from the closed end 14 to the open end of the second tubular, portion 15 of the support body 10.

A diaphragm valve member 23 which is made of a rubber-like material is secured sealingly with its circumferential portion to the open end of the third tubular portion 16 of the support body 10, defining a control chamber 24 between the diaphragm member 23 and the support body 10. An axial bore 25 is arranged in the support body 10 to allow the gauge chamber 11 and the control chamber 24 to communicate.

A clamping member 26, which is formed integrally with the cap 9, extends axially into the region 12. The clamping member 26 has an annular end 27 to depress the diaphragm member 23 against the open end of the second tubular portion 15 of the support body 10. The diameter of the annular end 27 is greater than that of the open end of the second tubular portion 15 so that the diaphragm member 23 contacts against or closes resiliently the open end of the axial bore 22.

In operation, the adapter member 2 is connected to a hose of a pump and an inflating valve of the tire to be inflated. When the pressure in the tire and the gas passage 6 exceeds a predetermined pressure, the valve plug 19 is actuated to an open position, permitting the excess gas to flow into the gauge chamber 11 from the gas passage 6. The gas in the gauge chamber 11 then flows into the control chamber 24 through the bore 25. When the pressure in the control chamber 24 increases to that capable of thrusting the central portion of the diaphragm member 23 to move away from the open end of the bore 22, the excess gas escapes through the axial bore 22 and the diametral bore 21. When the pressure is reduced, the diaphragm member 23 returns to its normal closed position. Upon continuous injection of the gas, the diaphragm member 23 vibrates at the open end of the second tubular portion 15 and produces sound to warn the operator to stop the operation. It can be appreciated that the pressue in the inflated tire will not exceed the desired predetermined pressure even though the operator is neglectful.

With the invention thus explained, it is apparent that various modifications and variations can be made without departing from the scope of the invention. It is therefore intended that the invention be limited as indicated in the appended claims.

What I claim is:

1. A pneumatic pressure gauge comprising:

(a) a gauge casing comprising first and second cylindrical portions threadedly coupled at first ends thereof;
   (b) first support means rigidly connected to a second end of said first cylindrical portion, said first support means having a passageway therethrough which is in communication with a bore of said first cylindrical portion;
   (c) second support means connected to a second end of said second cylindrical portion, said second support means having a first passageway therethrough which is in communication with a bore of said second cylindrical portion;
   (d) a pressure responsive valve means having a first position whereat said valve means abuts said first support means whereby said passageway in said first support means is closed, and a second position whereat said valve means does not abut said first support means, whereby said passageway in said first support means is open, said valve means being displaced from its first position to its second position in response to a predetermined pressure in said passageway in said first support means.
   (e) a pressure responsive diaphragm means made of elastic material and having a peripheral portion secured sealingly to said second support means, wherein said second support means comprises a substantially annular base portion, a first tubular portion rigidly connected to said base portion and having a bore, a second tubular portion rigidly connected to said base portion and having a bore, said first tubular portion being arranged in said bore of said second tubular portion, and a second passageway which is in communication with said bore of said first tubular portion and a space external to said second cylindrical portion, said diaphragm means being secured to an end of said second tubular portion and having a first position whereat said diaphragm means abuts an end of said first tubular portion, whereby said end of said first tubular portion is closed, said first and second tubular portions, said base portion and said diaphragm means defining an annular contol chamber when said diaphragm means is in its first position, said control chamber being in communication with said first passageway of said second support means, whereby said diaphragm is displaced from its first position to a second position in response to said predetermined pressure in said passageway of said first support means, control chamber and said bore of said first tubular portion being in communication when said diaphragm means is in its second position.

2. The pneumatic pressure gauge as defined in claim 1, further comprising a clamping means fixedly arranged relative to said second cylindrical portion, said clamping means having an annular projection in contact with said diaphragm means for holding said diaphragm means against said end of said first tubular portion, the diameter of said annular projection being greater than the diameter of said end of said first tubular portion.

3. The pneumatic pressure gauge as defined in claim 1, further comprising a tubular adapter means connected to said gauge casing and having a gas inlet, a gas outlet and a passageway extending between said gas inlet and said gas outlet, said gas passage being in communication with said passageway of said first support means.

* * * * *